United States Patent
Benisty et al.

(10) Patent No.: US 9,459,810 B2
(45) Date of Patent: Oct. 4, 2016

(54) STORAGE MODULE AND METHOD FOR CONFIGURING COMMAND ATTRIBUTES

(71) Applicant: SanDisk Technologies Inc., Plano, TX (US)

(72) Inventors: Shay Benisty, Beer-Sheva (IL); Tal Sharifie, Lehavim (IL)

(73) Assignee: SanDisk Technologies LLC, Plano, TX (US)

( * ) Notice: Subject to any disclaimer, the term of this patent is extended or adjusted under 35 U.S.C. 154(b) by 109 days.

(21) Appl. No.: 14/143,223

(22) Filed: Dec. 30, 2013

(65) Prior Publication Data

US 2015/0186074 A1  Jul. 2, 2015

(51) Int. Cl.

| | |
|---|---|
| *G06F 12/00* | (2006.01) |
| *G06F 3/06* | (2006.01) |
| *G06F 13/00* | (2006.01) |
| *G06F 13/28* | (2006.01) |

(52) U.S. Cl.
CPC ............. *G06F 3/0659* (2013.01); *G06F 3/061* (2013.01); *G06F 3/0607* (2013.01); *G06F 3/0661* (2013.01); *G06F 3/0679* (2013.01); *G06F 2206/1014* (2013.01)

(58) Field of Classification Search
CPC .... G06F 3/061; G06F 3/0679; G06F 3/0659; G06F 2206/1014
USPC .......................................... 711/115
See application file for complete search history.

(56) References Cited

U.S. PATENT DOCUMENTS

| | | | | |
|---|---|---|---|---|
| 5,361,389 | A * | 11/1994 | Fitch | 703/27 |
| 5,509,134 | A * | 4/1996 | Fandrich et al. | 711/103 |
| 2002/0129195 | A1* | 9/2002 | Hongo et al. | 711/104 |
| 2010/0057976 | A1* | 3/2010 | Lasser | 711/103 |

* cited by examiner

*Primary Examiner* — Mark Giardino, Jr.
(74) *Attorney, Agent, or Firm* — Brinks Gilson & Lione

(57) ABSTRACT

A storage module and method for configuring command attributes are provided. In one embodiment, a storage module is provided comprising a controller having hardware function blocks and further comprising a memory storing associations between command codes and command attributes for the hardware function blocks. The storage module receives a command that includes a command code and determines if the command code is stored in the memory. If the command code is stored in the memory, the storage module configures the hardware function blocks using the command attributes associated with command code and processes the command with the configured hardware function blocks. The associations are configurable after the storage module has been manufactured. This allows new or different associations to be defined after the storage module has been manufactured.

15 Claims, 8 Drawing Sheets

| Bit | 31 | 30 | 29 | 28 | 27 | 26 | 16 | 15 12 | 11 | 10 | 9 8 | 7 0 |
|---|---|---|---|---|---|---|---|---|---|---|---|---|
| Field | V | ADQ | CMTS | INT | DF | Other | | Type | HWC | SGLA | NSCH | OC |

Figure 7

| Field | Short description |
|---|---|
| V | Valid bit |
| ADQ | Admin Queue |
| CMTS | Check maximum transfer size |
| INT | Interrupt assertion |
| DF | Disable fetching new commands |
| Other | Other parameters |
| Type | Command type |
| HWC | Hardware candidate |
| SGLA | SGL Allowed |
| NSCH | Namespace checking |
| OC | Op-code |

Figure 8

STORAGE MODULE AND METHOD FOR CONFIGURING COMMAND ATTRIBUTES

BACKGROUND

Some storage modules, such as memory cards or solid state drives, have a controller that includes both hardware function blocks and a processor that can execute firmware. When the controller receives an incoming command, the controller parses and classifies the command and determines if the op-code of the command (e.g., op-code 0x90) is known to the controller. If it is, the controller looks up the command attributes associated with the op-code and configures the hardware function blocks with those command attributes. The hardware function blocks then process the command (e.g., by reading or writing data or by managing data specified in the command) according to the associated command attributes. While the same processing can be done in firmware, the hardware function blocks can perform the processing faster. If the op-code of the command is unknown to the controller, the controller does not have the command attributes with which to configure the hardware function blocks, and the command is processed by the firmware.

The association between op-codes and command attributes is defined during the design phase of the controller and is hardwired into the controller during manufacturing. So, during the application-specific integrated circuit (ASIC) chip design of the controller, respective command attributes are defined for each command that may be issued by a host (e.g., as defined in a standard), and the association between op-codes for the commands and command attributes are hardwired into the controller. Because the association is hardwired into the controller, this pre-set association cannot be changed after the controller is manufactured. Accordingly, if new commands are defined in standards that are implemented after tape out of the controller, the op-codes for those new commands will not be known to the controller. Therefore, those new commands will need to be executed exclusively by firmware instead of by the faster hardware logic, which can result in a loss of performance.

Overview

Embodiments of the present invention are defined by the claims, and nothing in this section should be taken as a limitation on those claims.

By way of introduction, the below embodiments relate to a storage module and method for configuring command attributes. In one embodiment, a storage module is provided comprising a controller having hardware function blocks and further comprising a memory storing associations between command codes and command attributes for the hardware function blocks. The storage module receives a command that includes a command code and determines if the command code is stored in the memory. If the command code is stored in the memory, the storage module configures the hardware function blocks using the command attributes associated with command code and processes the command with the configured hardware function blocks. The associations are configurable after the storage module has been manufactured. This allows new or different associations to be defined after the storage module has been manufactured.

Other embodiments are possible, and each of the embodiments can be used alone or together in combination. Accordingly, various embodiments will now be described with reference to the attached drawings.

BRIEF DESCRIPTION OF THE DRAWINGS

FIG. 7 is an illustration of a configurable command attribute register of an embodiment.

FIG. 8 is a table describing the fields of the configurable command attribute register of FIG. 7.

DETAILED DESCRIPTION OF THE PRESENTLY PREFERRED EMBODIMENTS

As mentioned above, in some prior storage modules, the association between command op-codes and command attributes for hardware function blocks are hardwired into the controller itself. So, if new commands are defined after the controller is manufactured, the controller cannot be modified to include an association of the op-codes of these new commands and their command attributes. Accordingly, those new commands will need to be executed exclusively by firmware instead of by the faster hardware logic, which can result in a loss of performance. The following embodiments provide a solution to this problem by presenting a storage module with a command attribute register that is configurable after the storage module has been manufactured. With the disclosed storage module, the association between op-codes for new commands and their command attributes can be defined after the storage module has been manufactured, so that the commands can be executed by hardware function blocks instead of by firmware. Before these embodiments are discussed, the following paragraphs provide a discussion of an exemplary storage module and host device that can be used with these embodiments. Of course, these are just examples, and other suitable types of storage modules and host devices can be used.

Figure 1:
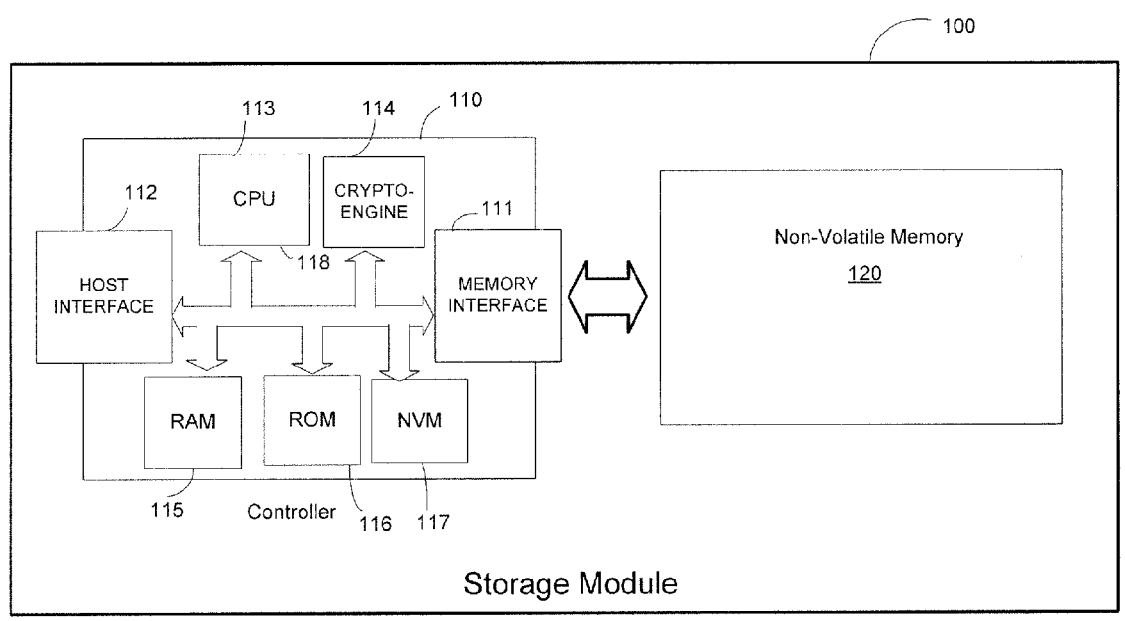
FIG. 1 is a block diagram of an exemplary storage module of an embodiment.

As illustrated in FIG. 1, a storage module 100 of one embodiment comprises a controller 110 and non-volatile memory 120. The controller 110 comprises a memory interface 111 for interfacing with the non-volatile memory 120 and a host interface 112 for placing the storage module 100 operatively in communication with a host controller. As used herein, the phrase "operatively in communication with" could mean directly in communication with or indirectly in communication with through one or more components, which may or may not be shown or described herein.

Figure 2A:
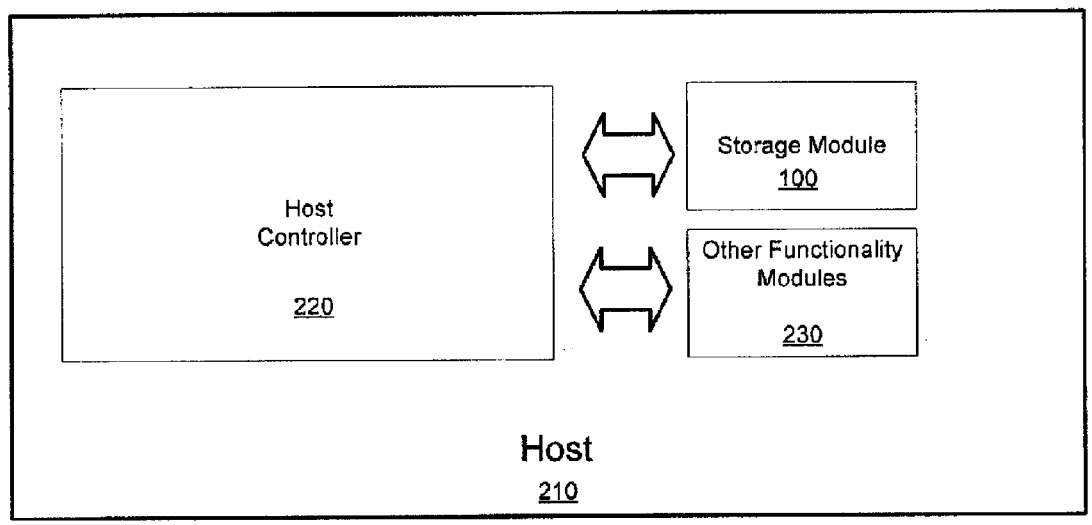
FIG. 2A is a block diagram of a host of an embodiment, where the exemplary storage module of FIG. 1 is embedded in the host.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. For example, the storage module 100 can take the form of an iNAND™ eSD/eMMC embedded flash drive by SanDisk Corporation. The host controller 220 can interface with the embedded storage module 100 using, for example, an eMMC host interface or a UFS interface. The host 210 can take any form, such as, but not limited to, a solid state drive (SSD), a hybrid storage device (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing.

Figure 2B:
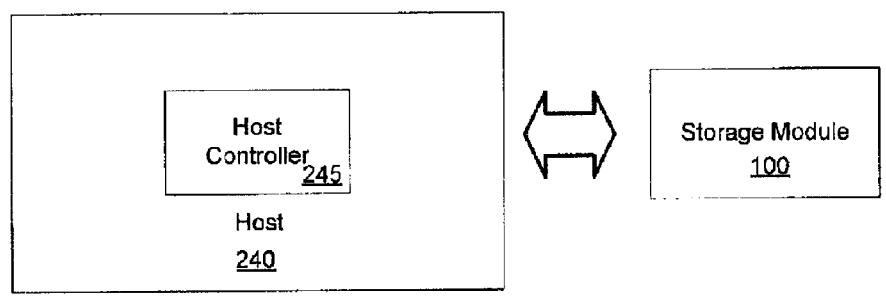
FIG. 2B is a block diagram of the exemplary storage module of FIG. 1 removably connected to a host, where the storage module and host are separable, removable devices

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a handheld, removable memory device, such as a Secure Digital (SD) memory card, a microSD memory card, a Compact Flash (CF) memory card, or a universal serial bus (USB) device (with a USB interface to the host), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via the host interface 112 shown in FIG. 1. The host interface 112 can take any suitable form, such as, but not limited to, an eMMC host interface, a UFS interface, and a USB interface. The host interface 110 in the storage module 100 conveys memory management commands from the host controller 220 (FIG. 2A) or host 240 (FIG. 2B) to the controller 110, and also conveys memory responses from the controller 110 to the host controller 220 (FIG. 2A) or host 240 (FIG. 2B). Also, it should be noted that when the storage module 100 is embedded in the host 210, some or all of the functions described herein as being performed by the controller 110 in the storage module 100 can instead be performed by the host controller 220.

The below embodiments discuss the storage module or host device being configured to perform certain functions. It should be understood that such configuring can be done by programming the controllers of the storage module and host device to perform these functions, or some or all of these functions can be performed with hardware components.

Returning to FIG. 1, the controller 110 comprises a central processing unit (CPU) 113, an optional hardware crypto-engine 114 operative to provide encryption and/or decryption operations, read access memory (RAM) 215, read only memory (ROM) 116 which can store firmware for the basic operations of the storage module 100, and a non-volatile memory (NVM) 117 which can store a device-specific key used for encryption/decryption operations, when used. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. Also, some of the components shown as being internal to the controller 110 can also be stored external to the controller 110, and other component can be used. For example, the RAM 115 (or an additional RAM unit) can be located outside of the controller die and used as a page buffer for data read from and/or to be written to the memory 120.

The non-volatile memory 120 can also take any suitable form. For example, in one embodiment, the non-volatile memory 120 takes the form of a solid-state (e.g., flash) memory and can be one-time programmable, few-time programmable, or many-time programmable. The non-volatile memory 120 can also use single-level cells (SLC) or multi-level cell (MLC). The non-volatile memory 120 can take the form of NAND Flash memory or of other memory technologies, now known or later developed. The non-volatile memory 120 can be used to store user or other data.

Figure 3:
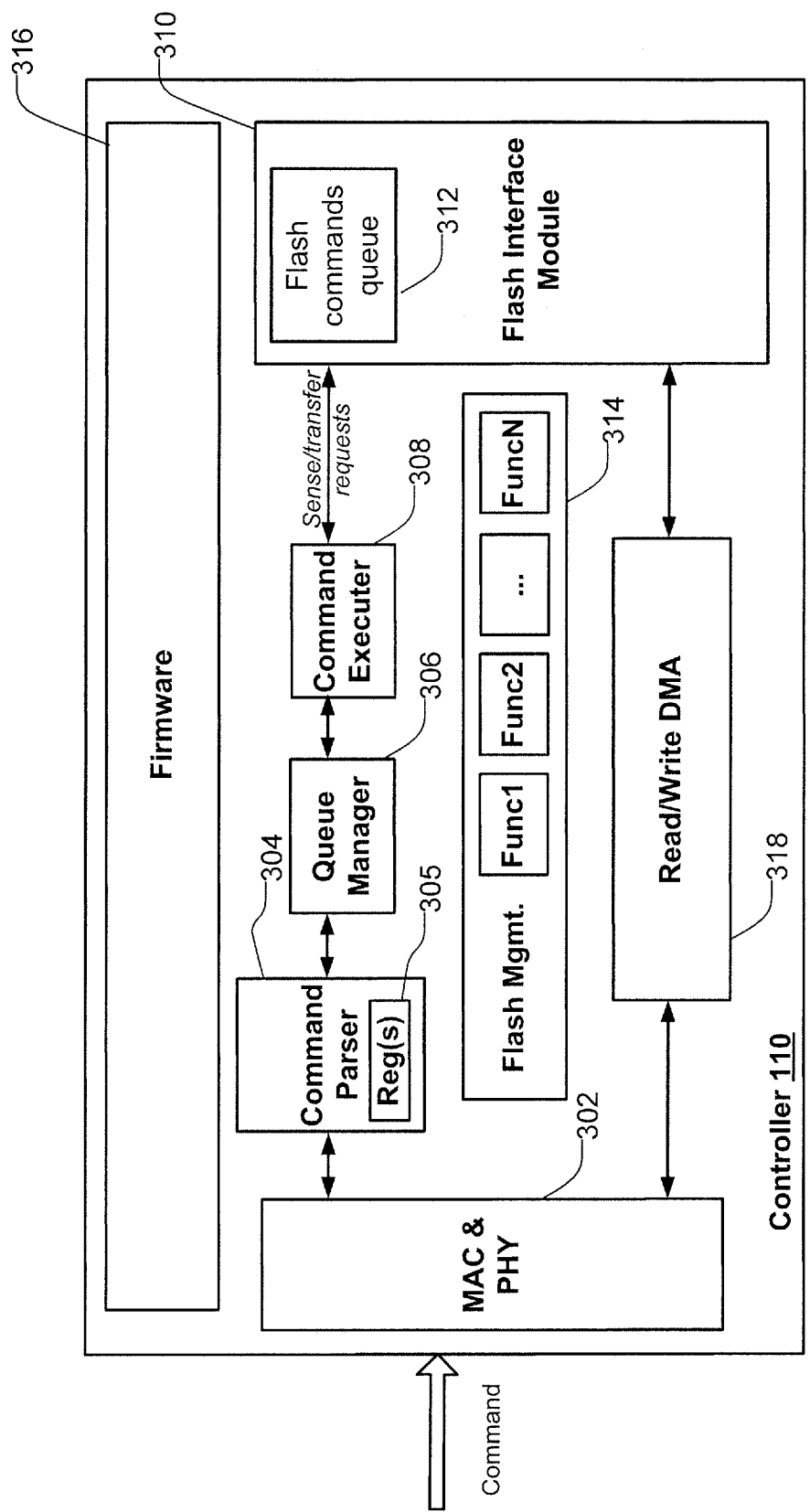
FIG. 3 is a block diagram of an exemplary controller of a storage module of an embodiment.

Returning to the drawings, FIG. 3 is an exemplary implementation of the controller 110, which shows its internal functional blocks and their interactions. While certain functions are shown as being present in certain blocks in FIG. 3, these functions can be implemented in different or additional blocks, depending on the design of the controller 110. In the particular implementation shown in FIG. 3, the host interface 112 takes the form of a MAC & PHY interface 302. The MAC & PNY interface 302 implements three low-protocol layers (the transaction layer, the data link layer, and the physical layer), and the MAC & PHY interface 302 makes sure that packets are transferred between the host and the storage module 100 without the errors defined in those layers. Of course, host interfaces other than MAC & PHY can be used, such as, but not limited to, those specified in the following standards: Peripheral Component Interconnect (PCI) Express, Serial Advanced Technology Attachment (SATA), and Non-Volatile Memory Express (NVMe).

As shown in FIG. 3, the MAC & PHY interface 302 communicates with two paths: one path has a command parser 304, a queue manager 306, and a command executer 308, and the other path has a read/write DMA module 318. Both paths terminate to the flash interface module 310, which is the memory interface 111 in this example. The command parser 304 path is the control path in the controller 110, while the read/write DMA 310 path is the data path in the controller 110. Firmware 316 is computer-executable program code that is executed by the CPU 113 of the controller 110 and can control and manage the functionality of the hardware logic and perform other functions. The flash management block 314 comprises a plurality of hardware function blocks (Func1, Func2, . . . FuncN) that may be responsible for internal memory management operations, such as address translation and other functions. The hardware function blocks are configured with data stored in a set of registers 305 in the command parser 304. These elements will be discussed in more detail below.

In operation, the MAC & PHY interface 302 receives a command (e.g., from a host). The command can be, for example, an input/output ("I/O") command (e.g., to read data from, write data to, or erase data from the non-volatile memory 120) or an administrative ("admin") command (e.g., a command for device configuration and maintenance). Typically, an operation code ("op-code") is associated with each command in a given standard. Some standards may use different phrases for this type of code, so the phrase "command code" will be used herein to broadly refer to an identifier of a command. While these embodiments can be used with any suitable standard or set of commands, for illustrative purposes only, some of the following embodiments will be discussed in terms of the Non-Volatile Memory Express (NVMe) standard. In the NVMe standard, the size of a command is 64 B, and the first 4B in all commands have the same structure. One of the fields in this structure contains the op-code, and the following tables illustrate the op-codes for several I/O and admin commands in the NVMe standard:

| I/O Commands | |
|---|---|
| Op-Code | I/O Command |
| 00h | Flush |
| 01h | Write |
| 02h | Read |
| 04h | Write Uncorrectable |
| 05h | Compare |
| 08h | Write Zeroes |
| 09h | Dataset Management |

| Admin Commands | |
|---|---|
| Op-Code | Admin Command |
| 00h | Delete I/O Submission Queue |
| 01h | Create I/O Submission Queue |
| 02h | Get Log Page |
| 04h | Delete I/O Completion Queue |
| 05h | Create I/O Completion Queue |
| 06h | Identify |
| 08h | Abort |
| 09h | Set Features |
| 0Ah | Get Features |
| 0Ch | Asynchronous Event Request |
| 10h | Firmware Activate |
| 11h | Firmware Image Download |

While these commands are well-known from the standard, the following provides a general description of several of these commands. Turning first to the I/O commands, the Flush command is used by the host to indicate that any data in volatile storage should be flushed to the non-volatile memory 120. The Read command reads data and metadata, if applicable, from the controller 110 for the LBAs indicated and may specify protection information to be checked as part of the read operation. The Write command writes data and metadata, if applicable, to the controller 110 for the logical blocks indicated, and the host may also specify protection information to include as part of the operation. Turning now to the admin commands, the Abort command is used to abort a specific command previously submitted to the Admin Submission Queue or an I/O Submission Queue. The Asynchronous Event Request command is a command submitted by host software to enable the reporting of asynchronous events from the controller. Asynchronous events are used to notify the host software of status, error, and health information as these events occur, and the controller 110 specifies an event to the host by completing an Asynchronous Event Request command. The Create/Delete I/O Completion/Submission Queues commands are used to create/delete I/O Completion/Submission Queues. The Identify command returns a data buffer that describes the controller 110, namespace capabilities and status, or a list of active namespace IDs. The Set Features command specifies the attributes of a selected NVMe feature, and the Get Features command retrieves the attributes of the feature specified in the command.

When the MAC & PHY interface 302 receives a command, it passes it to the command parser 304. The command parser 304 parses the command and checks its correctness. The command parser 304 may interact with the queue manager 306 in order to queue the command to the appropriate queue. Before execution by the firmware 316, commands may be pending in the queue manager 306. There may be many queues for difference purposes. Command executer 308 may be responsible for command selection and execution and may arbitrate between the pending commands, select the next executed command, and execute it by sending sense and transfer requests to the flash interface module ("FIM") 310. In one embodiment, the FIM 310 may include a flash command queue 312 for holding the last sense and transfer requests received from the command executer 308. FIM 128 interacts with the non-volatile memory 120 by sending flash commands.

When the command parser 304 parses the command, it reads the op-code from the op-code field, and, if the op-code is recognized, it configures the appropriate hardware function blocks in the flash management module 314 accordingly. While these functions can be performed in firmware 316, the functions are performed more quickly in hardware, which is why the hardware function blocks are sometimes referred to as hardware acceleration logic. Although some commands can be executed completely by the hardware function blocks, other commands are partially processed by the hardware function blocks then stored in the flash commands queue 312 (also referred to herein as the "firmware queue") for later execution/processing by the firmware 316. For simplicity, the hardware function blocks will be considered as "executing" the commands, even if further execution/processing of the command (e.g., by the firmware 316) is required.

The functions of the hardware function blocks can take any suitable form. For example, one or more of the hardware function blocks can perform several "sanity check" operations, such as checking whether the address in the command is a valid address and that the total transfer size of requested data is less than a maximum transfer size. As another example, one or more of the hardware function blocks can perform "tag overlap" detection, making sure that each command has its own unique command ID. As yet another example, one or more of the hardware function blocks can perform a "command dependency" check to find relationships between pending commands (e.g., to make sure that a write command for an address is finished before executing a subsequent read command for that address). As another example, one or more of the hardware function blocks can perform stream detection for read commands or provide context generation for accessing the memory 120. Again, these are merely examples, and other or different types of functions can be implemented in the hardware function blocks.

Because different commands can require different functions, the storage module 100 can store an association between commands and their associated command attributes. As used herein, "command attributes" refers to configuration information for one or more hardware function blocks in the storage module 100. Command attributes can specify, for example, which hardware function blocks are enabled/disabled and/or can specify values under which the hardware function blocks should operate for a given command. As discussed in the background section above, in some prior storage modules, the association between command op-codes and command attributes for hardware function blocks are hardwired into the controller itself. So, if new commands are defined after the controller is manufactured, the controller cannot be modified to include an association of the op-codes of these new commands and their command attributes. Accordingly, those new commands will need to be executed exclusively by firmware instead of by the faster hardware logic, which can result in a loss of performance.

To overcome this problem, the storage module 100 in this embodiment contains a set of registers 305 that store the association of op-codes and command attributes, and is configurable after the storage module 100 has been manufactured. Because the set of registers 305 is configurable after the storage module 100 has been manufactured, new or different associations between op-codes for new commands and their command attributes can be defined after the storage module 100 has been manufactured, so that the commands can be executed by hardware function blocks instead of firmware 316. The term "set of registers" can refer to one or more than one register. Also, the association between op-codes and command attributes can be stored in something other than a register (e.g., in a table or other data structure) and can be located in a location in the storage module 100 other than in the command parser 304. So, more generally, the association between command codes and command attributes can be stored in a memory in the storage module 100, where that memory can be a register in the controller 110, in another memory area in the controller 110 (e.g., in ROM 115, or NVM 117), in the non-volatile memory 120, or somewhere else in the storage module 100.

Figure 4:
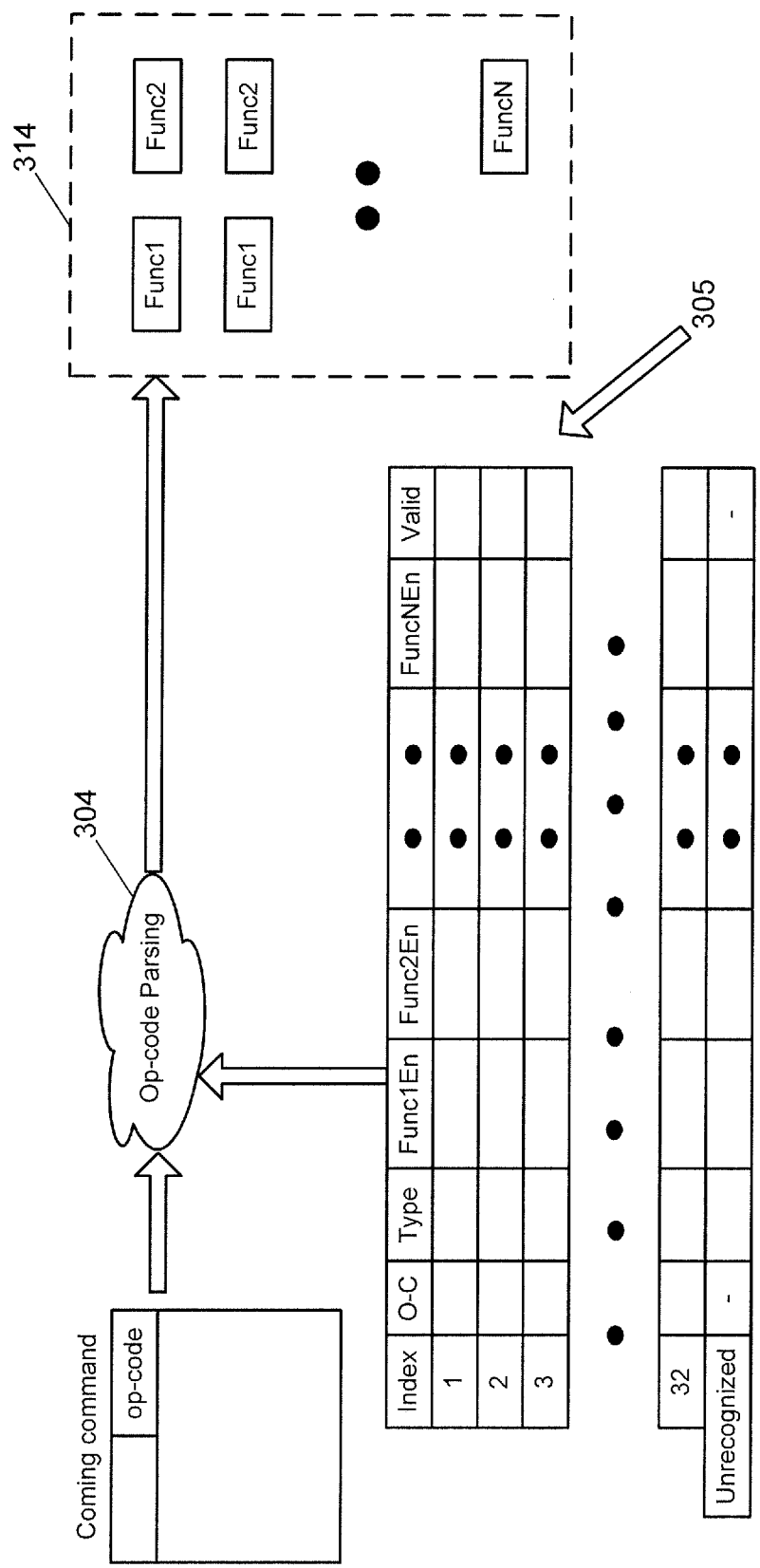
FIG. 4 is a block diagram of an embodiment illustrating a set of configurable command attribute registers being used to configure a plurality of hardware function blocks of a controller.

The operation of this embodiment will be discussed in more detail in conjunction with FIGS. 4-8. FIG. 4 shows the set of registers 305 before they are configured with op-code/command attribute associations. (In this embodiment, each line in the table is a register, with the whole table being held in a set of registers, although other configurations can be used.) As shown in FIG. 4, in this embodiment, the set of registers 305 contains fields for an index number, the op-code, the command type, block enablement fields for the various functions (Func1 . . . FuncN), and a valid bit. In this embodiment, there is one register for every command, and an additional register for any unrecognized command. Again, in this embodiment, the associations between op-codes for commands and command attributes can be defined after the storage module 100 has been manufactured. FIG. 4 shows the state of the storage module 100 after manufacturing, as there are no values in the set of registers 305. In one embodiment, the set of registers 305 may be implemented in flip flops, and the reset values of the set of registers 305 may reflect the defined command in a current version of a standard when taping out the ASIC. This may eliminate the need for adding firmware code to initiate those registers 305. In this case, a firmware initialization for those registers 305 may be needed only when a new command is defined after the ASIC tape-out.

Figure 5:
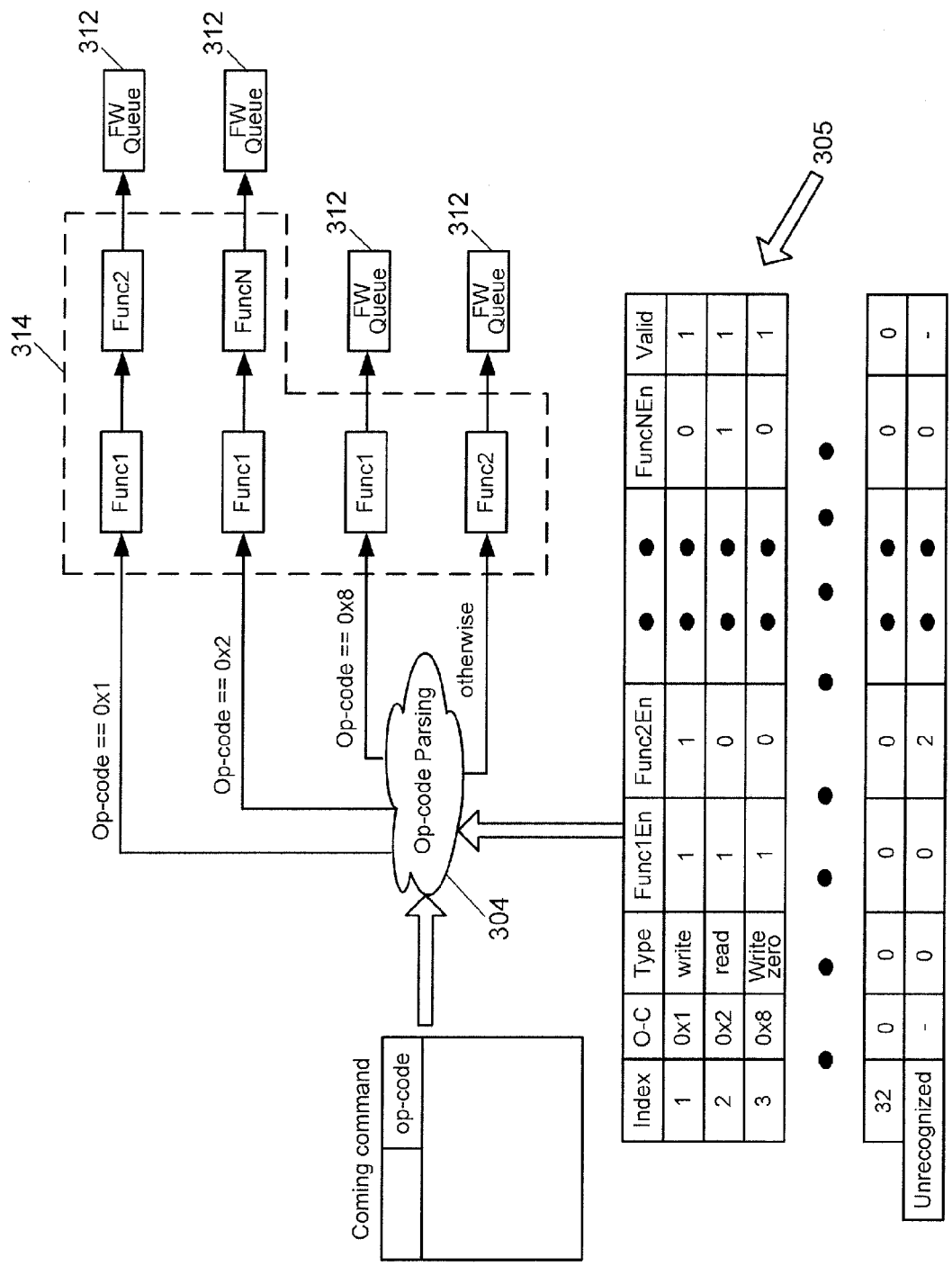
FIG. 5 is a block diagram of an exemplary implementation of FIG. 4.

FIG. 5 shows the state of the storage module 100 after the set of registers 305 has been configured. Each register defines a specific host command and hardware operation(s), and the value of each register can be based on commands defined in a standard. As shown in FIG. 5, the set of registers 305 associates op-code 0x1 (a write command) with hardware function blocks 1 and 2 being enabled, op-code 0x2 (a read command) with hardware function blocks 1 and N being enabled, and op-code 0x8 (a write zero command) with hardware function block 1 being enabled. The set of registers 305 also associates any unknown command with hardware function block N being enabled. In this embodiment, the number of registers in the set of registers 305 is greater than the number of commands defined in a standard because there is at least one extra register for unrecognized commands, and there can be spare registers to allow for supporting a larger number of commands in the future. Also, while this example shows the configuration information being whether or not a given hardware function block is enabled, it should be noted that the command attributes can also contain values (e.g., maximum transfer size, etc.) with which to configure the hardware function block. Accordingly, besides the function-enable bits shown in FIGS. 4 and 5, there can be other configuration parameters that configure the operation mode of the relevant function. Again, because the set of registers 305 is configurable, the value in these registers can be changed, new commands can be added, and existing commands can be deleted—all by the firmware 316 of the storage module 100 after manufacturing (e.g., in the field, at an OEM facility, etc.). In this way, the ASIC can support future versions of a standard or commands from a different standard after tape-out of the controller 110. In one embodiment, the set of registers 305 is configured by the firmware 316 during the initialization of the controller 110 in a way that complies with the standard protocol defined in the host.

Figure 6:
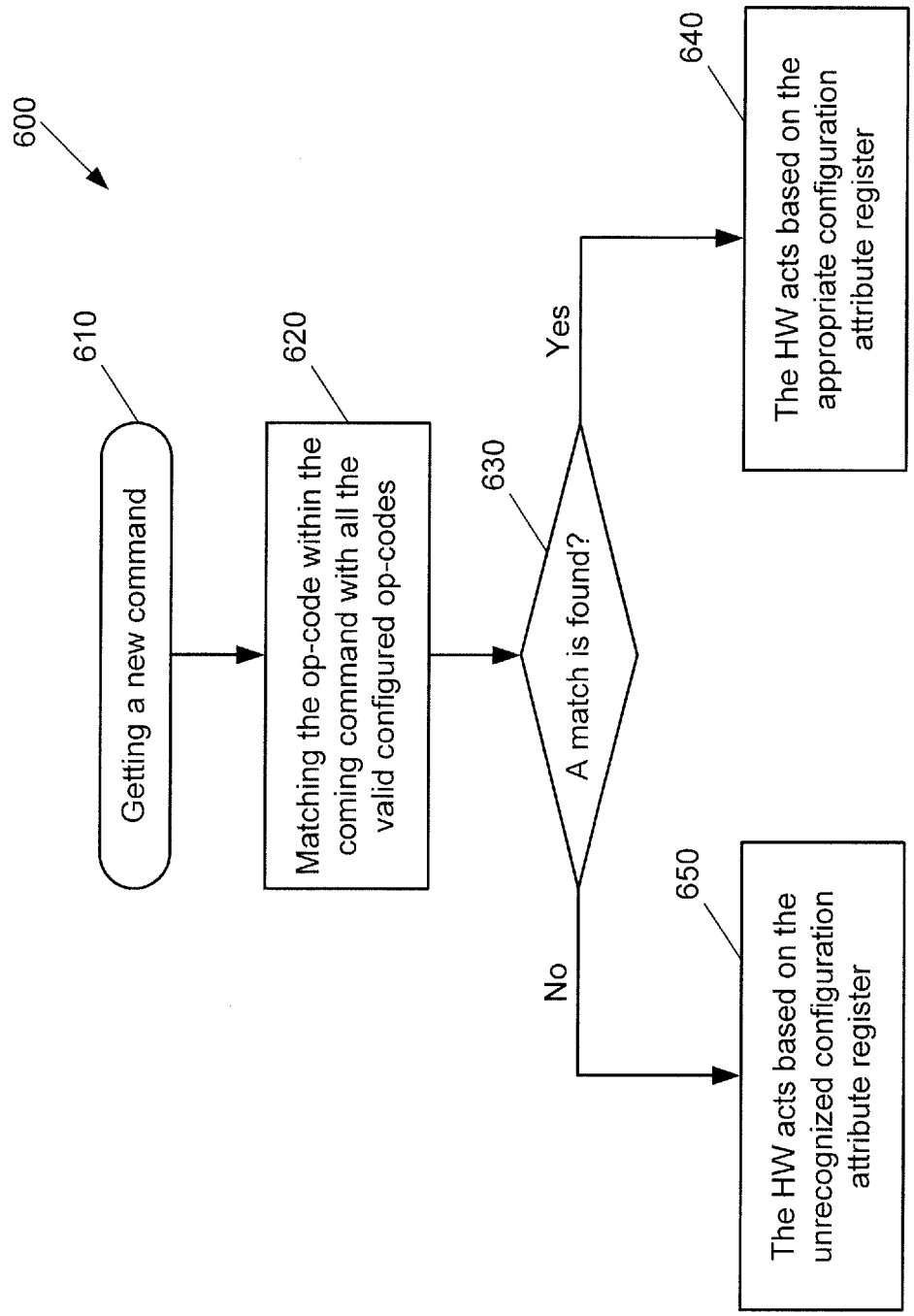
FIG. 6 is a flow chart of a method of an embodiment.

The flow chart 600 in FIG. 6 illustrates the operation of this embodiment. First, the command parser 304 gets a new command and parses out the op-code (act 610). Then, the command parser 304 attempts to match the op-code with the valid configured op-codes in the set of registers 305 to determine if there is a match (acts 620 and 630). If a match is found, the hardware function blocks are configured according to the associated command attributes in the register (act 640) (index 1-3 in the example shown in FIG. 5). That is, when a match is found, this means that the incoming command is a valid command within the command set defined in the storage module 100. In such case, the command parser 304 executes the command in hardware function blocks in the storage module 100 according to the command attributes defined in the command attribute register 305. If a match is not found, the hardware function blocks are configured according to the unrecognized command register (act 650). That is, in case a match is not found, this means that the incoming command is an unknown command (or invalid command) and is not part of the command set previously defined in the storage module 100. In such case, the command parser 304 operates as defined in the unknown command attribute register. Usually, the hardware automation in this case may be disabled, and a firmware intervention may be required by asserting an interrupt.

These acts are illustrated in FIG. 5 with the four variations in the set of registers 305: op-code 0x1, op-code 0c2, opcode 0x8, and an unrecognized command. In this embodiment, after the hardware function blocks perform there functions, the command can be sent to the firmware queue (e.g., the flash commands queue 312) for further execution by the firmware 316.

It should be noted that the association of op-codes and command attributes in FIG. 5 is just one example, and other associations can be used. For example, FIG. 7 shows different fields for a register of another embodiment, and FIG. 8 provides a short description of each of these fields, which are applicable to the NVMe standard. These fields include an interrupt assertion bit field that may prompt the assertion of an interrupt to the operation of the BE (Back-End) firmware in the storage module 100, a check maximum transfer size bit that determines whether the requested data specified by the command is within a defined transmission range supported in the system, an op-code (OC) field provided for parsing and categorizing the command, a disable fetching new commands field that prompts the hardware to temporarily stop fetching more incoming host commands from the host, a command type field, and a hardware candidate field that indicates the possibility of hardware automation for the particular command.

Figure 9:
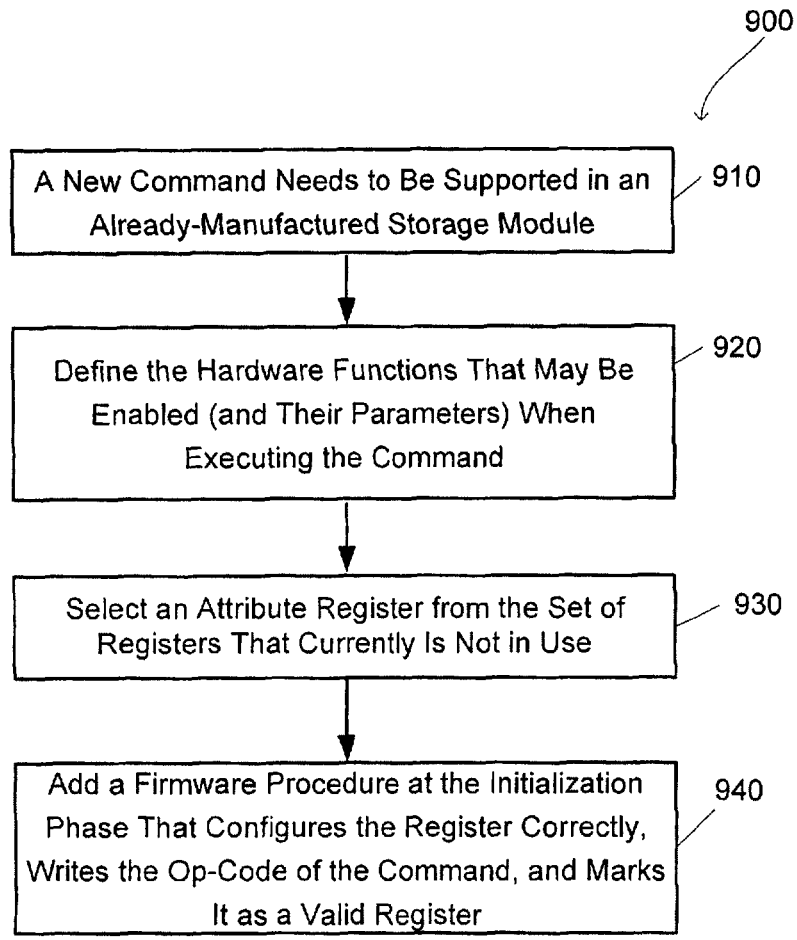
FIG. 9 is a flow chart of a method of an embodiment that is performed when a new command is needed to be supported in an already-manufactured storage module.

Returning to the drawings, FIG. 9 is a flow chart 900 of a method of an embodiment that is performed when a new command is needed to be supported in an already-manufactured storage module (act 910). In this method, the hardware functions that may be enabled for the command (and their parameters) are defined (act 920). Then, an attribute register from the set of registers 305 that currently is not in use is selected (act 930). Finally, a firmware procedure is added at the initialization phase that configures the register correctly, writes the op-code of the command, and marks the register as a valid register (act 940).

There are several advantages associated with these embodiments. First, because the association between op-codes and command attributes can be defined after the storage module 100 has been manufactured, new or different commands created after the ASIC tape-out of the controller 110 can still be supported by the hardware function blocks instead of by firmware. This increases the performance of the storage module 100. Again, because the set of registers 305 is configurable, the value in these registers can be changed, new commands can be added, and existing commands can be deleted—all by the firmware 316 of the storage module 100 after manufacturing (e.g., in the field, at an OEM facility, etc.). In this way, the ASIC can support future versions of a standard or commands from a different standard after tape-out of the controller 110. Accordingly, with these embodiments, firmware 316 in the storage module 100 defines and supports new commands (e.g., from new versions of a standard (e.g., SATA or NVMe)) after the ASIC tape out of the controller 110, so that those new commands can be processed by the hardware function blocks instead of by the firmware, which increases performance. With this functionality, these embodiments also enrich the debugging capability of the storage module 100.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage module comprising:
    a memory storing associations between command codes and command attributes, wherein the associations are configurable after the storage module has been manufactured; and
    a controller comprising hardware function blocks, wherein the controller is configured to:
        receive a command that includes a command code;
        determine if the command code is stored in the memory;
        if the command code is stored in the memory:
            configure the hardware function blocks using the command attributes associated with command code; and
            execute the command with the configured hardware function blocks; and
        if the command code is not stored in the memory, execute the command using firmware in the storage module.

2. The storage module of claim 1, wherein the memory storing the associations is a set of registers in the controller.

3. The storage module of claim 2, wherein the set of registers is in a command parser in the controller.

4. The storage module of claim 1, wherein controller is further configured to:
    receive a change to the associations between command codes and command attributes; and
    write the change in the memory.

5. The storage module of claim 1, wherein the associations are configurable by firmware in the storage module.

6. The storage module of claim 1, wherein the controller is further configured to perform further processing of the command by firmware in the storage module after the command is processed by the configured hardware function blocks.

7. The storage module of claim 1, wherein the storage module is embedded in a host.

8. The storage module of claim 1, wherein the storage module is removably connected to a host.

9. A method for configuring command attributes, the method comprising:
    performing the following in a storage module, wherein the storage module comprises a controller with hardware function blocks and a memory storing associations between command codes and command attributes, wherein the associations are configurable after the storage module has been manufactured:
        receiving a command that includes a command code;
        determining if the command code is stored in the memory;
        if the command code is stored in the memory:
            configuring the hardware function blocks using the command attributes associated with command code; and
            executing the command with the configured hardware function blocks; and
        if the command code is not stored in the memory, executing the command using firmware in the storage module.

10. The method of claim 9, wherein the memory storing the associations is a set of registers in the controller.

11. The method of claim 10, wherein the set of registers is in a command parser in the controller.

12. The method of claim 9, wherein the associations are stored by firmware in the storage module.

13. The method of claim 9 further comprising performing further processing of the command by firmware in the storage module after the command is processed by the configured hardware function blocks.

14. The method of claim 9, wherein the storage module is embedded in a host.

15. The method of claim 9, wherein the storage module is removably connected to a host.

* * * * *